US008521516B2

(12) United States Patent
Och et al.

(10) Patent No.: US 8,521,516 B2
(45) Date of Patent: Aug. 27, 2013

(54) LINGUISTIC KEY NORMALIZATION

(75) Inventors: Franz Josef Och, Palo Alto, CA (US); Ignacio E Thayer, San Francisco, CA (US); Ioannis Tsochandaridis, San Francisco, CA (US); Dmitriy Genzel, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 798 days.

(21) Appl. No.: 12/411,224

(22) Filed: Mar. 25, 2009

(65) Prior Publication Data
US 2013/0151235 A1 Jun. 13, 2013

Related U.S. Application Data

(60) Provisional application No. 61/039,753, filed on Mar. 26, 2008.

(51) Int. Cl.
G06F 17/21 (2006.01)

(52) U.S. Cl.
USPC ............ 704/10; 704/1; 704/2; 704/3; 704/4; 704/7; 704/8; 704/9; 704/275; 382/224

(58) Field of Classification Search
USPC ................... 704/1–10; 707/601–606
See application file for complete search history.

(56) References Cited

U.S. PATENT DOCUMENTS

| | | | | |
|---|---|---|---|---|
| 4,355,370 A * | 10/1982 | Yanagiuchi | ...................... | 704/6 |
| 5,099,426 A * | 3/1992 | Carlgren et al. | .................. | 704/9 |
| 5,426,760 A * | 6/1995 | Moreland | ..................... | 711/170 |
| 5,594,641 A * | 1/1997 | Kaplan et al. | ......................... | 1/1 |
| 5,708,829 A * | 1/1998 | Kadashevich et al. | ........ | 715/236 |
| 5,708,929 A * | 1/1998 | Adachi et al. | ................ | 399/149 |
| 5,752,052 A * | 5/1998 | Richardson et al. | ............. | 704/9 |
| 5,794,177 A * | 8/1998 | Carus et al. | ....................... | 704/9 |
| 5,805,832 A * | 9/1998 | Brown et al. | ..................... | 711/1 |
| 5,991,710 A * | 11/1999 | Papineni et al. | .................. | 704/2 |
| 5,995,922 A * | 11/1999 | Penteroudakis et al. | ......... | 704/9 |
| 6,023,670 A * | 2/2000 | Martino et al. | .................... | 704/8 |
| 6,073,099 A * | 6/2000 | Sabourin et al. | ........... | 704/256.6 |
| 6,081,774 A * | 6/2000 | de Hita et al. | .................... | 704/9 |
| 6,108,627 A * | 8/2000 | Sabourin | ...................... | 704/243 |
| 6,173,253 B1 * | 1/2001 | Abe et al. | ........................ | 704/10 |
| 6,192,333 B1 * | 2/2001 | Pentheroudakis | .............. | 704/10 |
| 6,246,981 B1 * | 6/2001 | Papineni et al. | ............. | 704/235 |
| 6,260,008 B1 * | 7/2001 | Sanfilippo | ......................... | 704/9 |
| 6,275,789 B1 * | 8/2001 | Moser et al. | ..................... | 704/7 |

(Continued)

OTHER PUBLICATIONS

Empirical Methods for Compound Splitting, Philipp Koehn and Kevin Knight, EACL 2003.*

(Continued)

*Primary Examiner* — Pierre-Louis Desir
*Assistant Examiner* — Fariba Sirjani
(74) *Attorney, Agent, or Firm* — Remarck Law Group PLC

(57) ABSTRACT

Systems, methods, and apparatuses including computer program products are provided for training machine learning systems. In some implementations, a method is provided. The method includes receiving a collection of phrases, normalizing a plurality of phrases of the collection of phrases, the normalizing being based at least in part on lexicographic normalizing rules, and generating a normalized phrase table including a plurality of key-value pairs, each key value pair includes a key corresponding to a normalized phrase and a value corresponding to one or more un-normalized phrases associated with the normalized key, each un-normalized phrase having one or more parameters.

26 Claims, 5 Drawing Sheets

(56) References Cited

U.S. PATENT DOCUMENTS

| | | | |
|---|---|---|---|
| 6,308,149 B1* | 10/2001 | Gaussier et al. | 704/9 |
| 6,385,630 B1* | 5/2002 | Ejerhed | 715/202 |
| 6,393,389 B1* | 5/2002 | Chanod et al. | 704/7 |
| 6,411,932 B1* | 6/2002 | Molnar et al. | 704/260 |
| 6,615,168 B1* | 9/2003 | Resnik et al. | 704/8 |
| 6,721,734 B1* | 4/2004 | Subasic et al. | 1/1 |
| 6,904,402 B1* | 6/2005 | Wang et al. | 704/10 |
| 6,983,240 B2* | 1/2006 | Ait-Mokhtar et al. | 704/9 |
| 7,092,871 B2* | 8/2006 | Pentheroudakis et al. | 704/9 |
| 7,209,875 B2* | 4/2007 | Quirk et al. | 704/2 |
| 7,212,964 B1* | 5/2007 | Alshawi et al. | 704/10 |
| 7,318,022 B2* | 1/2008 | Li | 704/10 |
| 7,349,845 B2* | 3/2008 | Coffman et al. | 704/257 |
| 7,392,174 B2* | 6/2008 | Freeman | 704/9 |
| 7,398,210 B2* | 7/2008 | Valdes et al. | 704/257 |
| 7,409,332 B2* | 8/2008 | Moore | 704/2 |
| 7,421,386 B2* | 9/2008 | Powell et al. | 704/10 |
| 7,610,188 B2* | 10/2009 | Weise | 704/8 |
| 7,610,193 B2* | 10/2009 | Sites | 704/9 |
| 7,617,091 B2* | 11/2009 | Kempe et al. | 704/9 |
| 7,664,629 B2* | 2/2010 | Dymetman et al. | 704/4 |
| 7,734,460 B2* | 6/2010 | Yu et al. | 704/9 |
| 7,752,193 B2* | 7/2010 | Weber | 707/711 |
| 7,765,098 B2* | 7/2010 | Bradford | 704/9 |
| 7,774,198 B2* | 8/2010 | Roulland et al. | 704/9 |
| 7,783,473 B2* | 8/2010 | Bangalore et al. | 704/2 |
| 7,788,085 B2* | 8/2010 | Brun et al. | 704/9 |
| 7,788,276 B2* | 8/2010 | Peng et al. | 707/765 |
| 7,813,916 B2* | 10/2010 | Bean | 704/9 |
| 7,917,355 B2* | 3/2011 | Wu et al. | 704/10 |
| 7,937,265 B1* | 5/2011 | Pasca et al. | 704/9 |
| 7,983,902 B2* | 7/2011 | Wu et al. | 704/10 |
| 7,991,608 B2* | 8/2011 | Johnson et al. | 704/9 |
| 8,036,876 B2* | 10/2011 | Sanfilippo et al. | 704/9 |
| 8,041,559 B2* | 10/2011 | El-Shishiny | 704/9 |
| 8,126,698 B2* | 2/2012 | Washizawa et al. | 704/2 |
| 8,209,163 B2* | 6/2012 | Suzuki et al. | 704/2 |
| 8,209,164 B2* | 6/2012 | Etzioni et al. | 704/2 |
| 8,229,729 B2* | 7/2012 | Sarikaya et al. | 704/4 |
| 8,412,513 B2* | 4/2013 | Anisimovich et al. | 704/4 |
| 2001/0014902 A1* | 8/2001 | Hu et al. | 707/540 |
| 2002/0099730 A1* | 7/2002 | Brown et al. | 707/500 |
| 2003/0028564 A1* | 2/2003 | Sanfilippo | 707/513 |
| 2003/0093263 A1* | 5/2003 | Chen et al. | 704/10 |
| 2003/0200199 A1* | 10/2003 | Snyder | 707/2 |
| 2004/0019601 A1* | 1/2004 | Gates | 707/102 |
| 2004/0088156 A1* | 5/2004 | Kanagasabai et al. | 704/9 |
| 2004/0098247 A1* | 5/2004 | Moore | 704/4 |
| 2004/0117774 A1* | 6/2004 | Glushnev et al. | 717/136 |
| 2004/0186706 A1* | 9/2004 | Itoh et al. | 704/10 |
| 2004/0193401 A1* | 9/2004 | Ringger et al. | 704/9 |
| 2005/0015240 A1* | 1/2005 | Appleby | 704/9 |
| 2005/0091030 A1* | 4/2005 | Jessee et al. | 704/4 |
| 2005/0192792 A1* | 9/2005 | Carus et al. | 704/2 |
| 2005/0251381 A1* | 11/2005 | Pentheroudakis et al. | 704/4 |
| 2005/0251385 A1* | 11/2005 | Iwahashi | 704/10 |
| 2005/0262210 A1* | 11/2005 | Yu | 709/206 |
| 2005/0273318 A1* | 12/2005 | Zhou et al. | 704/10 |
| 2006/0129384 A1* | 6/2006 | Sites | 704/10 |
| 2006/0173886 A1* | 8/2006 | Moulinier et al. | 707/101 |
| 2006/0200336 A1* | 9/2006 | Cipollone et al. | 704/4 |
| 2006/0206308 A1* | 9/2006 | Moore | 704/5 |
| 2006/0206313 A1* | 9/2006 | Xu et al. | 704/10 |
| 2007/0083357 A1* | 4/2007 | Moore et al. | 704/4 |
| 2007/0083359 A1* | 4/2007 | Bender | 704/9 |
| 2007/0185901 A1* | 8/2007 | Gates | 707/102 |
| 2007/0219774 A1* | 9/2007 | Quirk et al. | 704/2 |
| 2007/0219782 A1* | 9/2007 | Li | 704/10 |
| 2007/0265832 A1* | 11/2007 | Bauman et al. | 704/10 |
| 2007/0288448 A1* | 12/2007 | Datta | 707/5 |
| 2008/0015842 A1* | 1/2008 | Moore | 704/4 |
| 2008/0025617 A1* | 1/2008 | Posse et al. | 382/224 |
| 2008/0077396 A1* | 3/2008 | Hsu | 704/10 |
| 2008/0077548 A1* | 3/2008 | Michelin | 706/50 |
| 2008/0091413 A1* | 4/2008 | El-Shishiny et al. | 704/10 |
| 2008/0091434 A1* | 4/2008 | Rodriguez et al. | 704/275 |
| 2008/0201133 A1* | 8/2008 | Cave et al. | 704/10 |
| 2008/0312910 A1* | 12/2008 | Zhang | 704/10 |
| 2008/0319738 A1* | 12/2008 | Liu et al. | 704/10 |
| 2009/0063126 A1* | 3/2009 | Itagaki et al. | 704/2 |
| 2009/0083023 A1* | 3/2009 | Foster et al. | 704/3 |
| 2009/0099837 A1* | 4/2009 | Alshawi et al. | 704/7 |
| 2009/0132233 A1* | 5/2009 | Etzioni et al. | 704/3 |
| 2009/0182549 A1* | 7/2009 | Anisimovich et al. | 704/4 |
| 2009/0187401 A1* | 7/2009 | Vuong et al. | 704/10 |
| 2009/0204392 A1* | 8/2009 | Ishikawa | 704/10 |
| 2009/0248401 A1* | 10/2009 | Grabarnik et al. | 704/10 |
| 2009/0271179 A1* | 10/2009 | Marchisio et al. | 704/9 |
| 2009/0326912 A1* | 12/2009 | Ueffing | 704/2 |
| 2010/0094614 A1* | 4/2010 | Bilac et al. | 704/2 |
| 2010/0114558 A1* | 5/2010 | Fluhr et al. | 704/5 |
| 2010/0153092 A1* | 6/2010 | Peoples et al. | 704/9 |
| 2010/0235313 A1* | 9/2010 | Rea et al. | 706/52 |
| 2010/0256973 A1* | 10/2010 | Chen et al. | 704/4 |
| 2011/0251839 A1* | 10/2011 | Achtermann et al. | 704/9 |
| 2012/0197631 A1* | 8/2012 | Ramani et al. | 704/9 |
| 2012/0209592 A1* | 8/2012 | Cherepanov et al. | 704/9 |

OTHER PUBLICATIONS

Dean, J. and Ghemawat, S., "MapReduce: Simplified Data Processing on Large Clusters," Proceedings of the 6th Symposium on Operating Systems Design and Implementation, pp. 137-150 (2004).

Brown, P.F., Della Pietra, V.J., Della Pietra, S.A., and Mercer, R.L., "The Mathematics of Statistical Machine Translation: Parameter Estimation", Computational Linguistics 19(2), 1993.

Papineni, K., Roukos, S., Ward, T., and Zhu, W., "BLEU: a Method for Automatic Evaluation of Machine Translation," Proceedings of the 40th Annual Meeting on the Association for Computational Linguistics, pp. 311-318, Jul. 2002.

* cited by examiner

LINGUISTIC KEY NORMALIZATION

CROSS-REFERENCE TO RELATED APPLICATIONS

This application claims the benefit under 35 U.S.C. §119 (e) of U.S. Provisional Application Ser. No. 61/039,753, filed on Mar. 26, 2008.

BACKGROUND

This specification relates to natural language processing using a linguistic key normalization.

Natural language processing systems include machine learning and rule-based systems. Natural language processing typically uses statistical techniques to iteratively process training data in order to improve the accuracy of one or more predictive functions. For example, one type of machine learning is a classification system that generates a function mapping inputs to desired outputs. The system learns parameters of a function that maps a vector into one of several classes by looking at several input-output examples.

Natural language processing can be used in a number of applications including language modeling, machine translation, language identification, syntactic pattern recognition, and speech recognition.

SUMMARY

In general, one aspect of the subject matter described in this specification can be embodied in methods that include the actions of receiving a collection of phrases; normalizing multiple phrases of the collection of phrases, the normalizing being based at least in part on lexicographic normalizing rules; and generating a normalized phrase table including key-value pairs, each key value pair includes a key corresponding to a normalized phrase and a value corresponding to one or more un-normalized phrases associated with the normalized key, each un-normalized phrase having one or more parameters. Other embodiments of this aspect include corresponding systems, apparatus, and computer program products.

These and other embodiments can optionally include one or more of the following features. Normalizing each phrase of the multiple phrases includes applying one or more normalizing rules, the one or more normalizing rules including rules normalizing based on a case and a morphology of the phrase. The one or more parameters of each un-normalized phrase include a probability associated with the phrase, a translation of the phrase and a corresponding probability, and an identification of a language associated with the phrase. The normalized phrase table includes multiple normalized phrases corresponding to un-normalized phrases in multiple languages.

In general, one aspect of the subject matter described in this specification can be embodied in methods that include the actions of receiving training phrase; normalizing the phrase according to one or more lexicographic normalization rules; identifying the normalized phrase using normalized phrase table, the normalized phrase table including multiple key-value pairs, each key value pair includes a key corresponding to a normalized phrase and a value corresponding to one or more un-normalized phrases associated with the normalized key, each un-normalized phrase having one or more parameters; associating one or more weights to the received training phrase based on the associated one or more un-normalized phrases; and training a machine learning model using the one or more un-normalized phrases and the associated one or more weights. Other embodiments of this aspect include corresponding systems, apparatus, and computer program products.

These and other embodiments can optionally include one or more of the following features. The method can further include determining whether the received training phrase matches an un-normalized phrase associated with the identified normalized phrase; associating a first weight to the training phrase when the training phrase matches an un-normalized phrase associated with the normalized phrase; and associating a second weight to the training phrase when the training phrase does not match an un-normalized phrase associated with the normalized phrase. Associating one or more weights further includes assigning a weight to each un-normalized phrase based on a distance measure between each un-normalized phrase to the identified normalized phrase. The distance measure includes determining a distance vector having entries corresponding to the particular normalization rules.

Training a machine learning model includes using one or more un-normalized phrases and their associated assigned weights as particular feature functions for the received phrase in a machine learning model. Training a machine learning model includes training a language model, a language identification model, or a statistical machine translation model. Identifying the normalized phrase includes identifying a particular chunk of a distributed normalized phrase table including a key value corresponding to the normalized phrase and searching the identified chunk for the normalized phrase.

Particular embodiments of the subject matter described in this specification can be implemented to realize one or more of the following advantages. Using normalized phrases reduces processing required to perform phrase lookup while preserving information associated with un-normalized phrase variants of the normalized phrases. Storing several un-normalized variants under a same normalized key allows backing off if an original un-normalized key is not found, for example, in a normalized phrase table.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
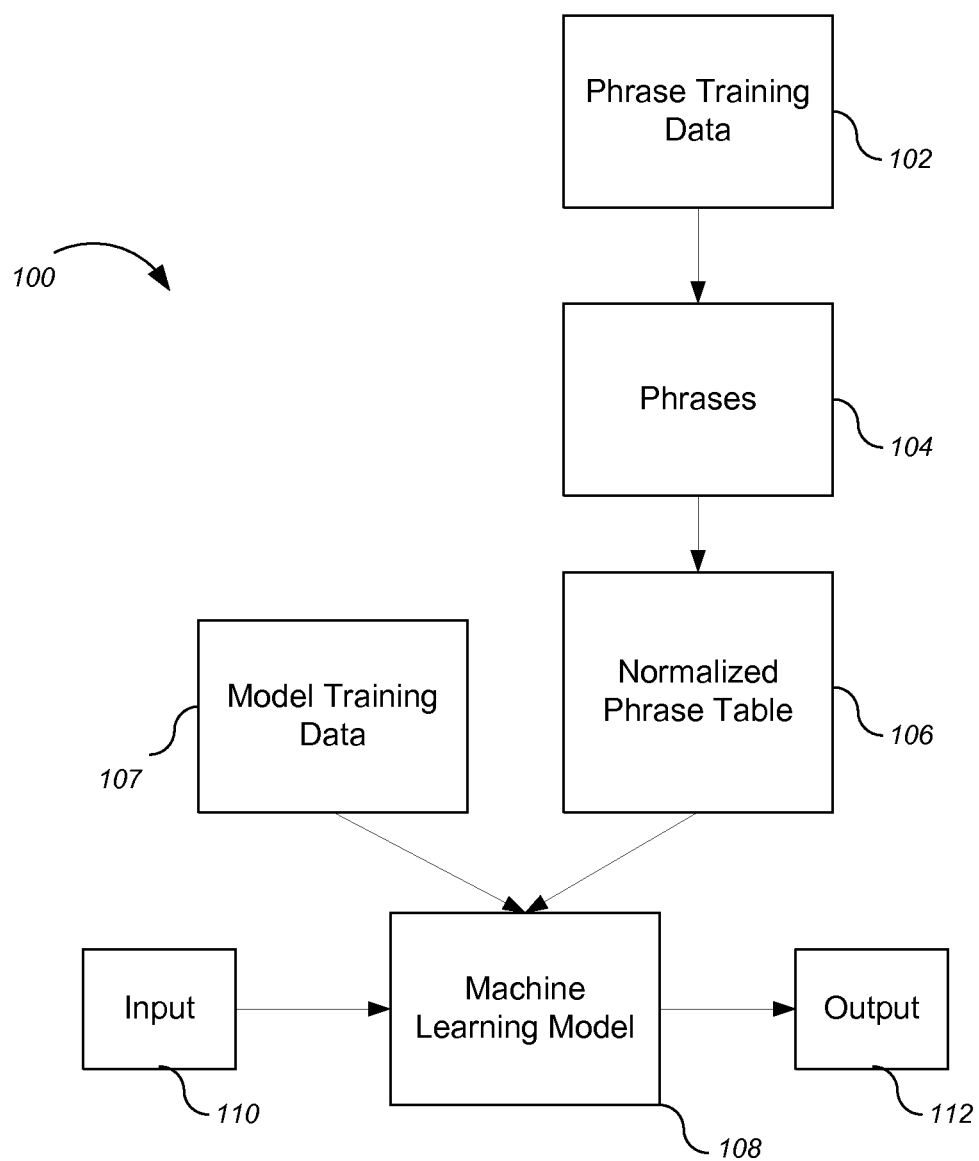
FIG. 1 shows a block diagram of an example architecture of a machine learning system using a normalized phrase table.

FIG. 1 shows a block diagram of an example architecture of a machine learning system 100 using a normalized phrase table 106. The machine learning system includes phrase training data 102. The phrase training data 102 includes a corpus of text (e.g., documents, web pages, news articles, blogs, messaging text, and other text sources). The content of the corpus of text in the phrase training data 102 can vary depending on the machine learning application.

For example, for a language model, the training data can include a corpus of text in a single language while for a machine translation application the corpus of text can include parallel text in two or more languages (e.g., English, French, Chinese). The parallel text can include pairs of text where a first text of the pair is a translation of the second text of the pair. In some other implementations, the phrase training data 102 includes one or more annotated corpora. The annotated corpora can include annotations, for example, to one or more words or phrases of text within the annotated corpora. The annotations can include, for example, tags identifying parts of speech, a semantic category, or a syntactic category.

For example, the phrase training data 102 can include text on the order of tens to hundreds of billions of words, or even more. One such corpus is the Linguistic Data Consortium ("LDC") Web 1T 5-gram Version 1 corpus, LDC Catalog No.: DC2006T13, ISBN: 1-58563-397-6, contributed by Google Inc. This corpus uses approximately one trillion tokens (including individual words, punctuation, and markers identifying a beginning and end of individual sentences) of text from publicly accessible Web pages.

In another example, the phrase training data 102 can include multi-lingual parallel text. For example, United Nations proceedings are available, which provide parallel translations in six languages.

The phrases 104 include a collection of phrases in one or more languages. A phrase is a group of one or more consecutive tokens (e.g., an n-gram) that carry a concrete and complete meaning and can function as a single syntactic unit in a sentence. A token can include, for example, individual words, punctuation, and markers (e.g., identifying a beginning or end of a sentence). In some implementations, the phrases 104 include millions of distinct phrases.

The phrases 104 can be derived from the corpus of text in the phrase training data 102 using one or more phrase generation techniques. The system can extract phrases from text strings having one or more tokens in the phrase training data 102. For example, a sentence or other text string can include one or more phrases. Each phrase candidate can be an n-gram extracted from the corpus. For example, the system can extract phrase candidates from text strings in the phrase training data 102 including, e.g., sentences of web documents and web queries. Thus, in some natural language processing applications, e.g., language modeling, the phrases can correspond to extracted n-grams.

In some implementations, phrase candidates are filtered to remove URL's, IP addresses, dates, symbols, and other non-phrases, e.g., advanced search operators. Additionally, long phrases can be removed or alternatively not included in the phrase candidate extraction (e.g., n-grams of order 10 or higher).

In some implementations, the phrases are bilingual phrases, for example, for use in machine translation applications. Bilingual phrases (e.g., phrase pairs) are n-grams in two languages that have been identified as corresponding to each other in some way. For example, the bilingual phrase can include phrase pairs that have been aligned (e.g., an alignment processing identified the phrases as corresponding to each other). In some implementations, the phrase training data 102 include alignment information for identifying bilingual phrases.

The phrases 104 can also include one or more probabilities associated with the collections of phrases. For example, each phrase can have a particular probability of occurring within the corpus of text. Thus, for English, this probability is the likelihood that a particular phrase occurs in English. To identify the probability of a particular phrase occurring, the number of times the phrase occurs in the training data 102 is divided by the total number of phrases in the training data. For example, if the phrase "the red wheelbarrow" occurs 53,000 times in a corpus of 100,000,000 words, the probability equals:

$$P(\text{the red wheelbarrow}) = \frac{53,000}{100,000,000} = 0.00053.$$

However, a number of possible phrases will have a probability of zero since they are not found within the phrase training data 102. Therefore, in some implementations, the system calculates the probability of a particular phrase as a function of the probabilities of sub-string components. One technique for representing sub-strings is by using n-grams. An n-gram is a sequence of n consecutive tokens. An n-gram has an order, which is the number of tokens in the n-gram. For example, a 1-gram (or unigram) includes one token; a 2-gram (or bigram) includes two tokens.

The n-gram sub-strings can be used to calculate the probability of a phrase. The probability of a given phrase can be calculated as a product of n-gram conditional probabilities. The conditional probability for a bigram, represented $P(y|x)$, is the probability that word y follows word x. Determining conditional probabilities generally includes an empirical calculation according to relative frequencies in the corpus of text (e.g., in the training data 102). In the example above, the probability of the word y given x is given by:

$$P(y|x) = \frac{f(xy)}{f(x)},$$

where f(xy) is a frequency or a count of the occurrences of the phrase "xy" in the corpus of text.

Determining the probability for the string can include calculating a product of conditional probabilities. For example, to calculate P(the red wheelbarrow) for the phrase "the red wheelbarrow" using a bigram language model, the n-gram language model calculates:

P(red|the)P(wheelbarrow|red).

This phrase probability can be generalized to:

$$P(e_1, \ldots, e_k) = \prod_{i=1}^{k} P(e_i | e_{i-n+1}, \ldots, e_{i-1})$$

where $(e_1, \ldots, e_k)$ represent tokens in the phrase and n is the order of the largest n-gram allowed.

In machine translation applications, the phrases 104 can also include the conditional probability of a particular phrase in one language given a particular phrase in another language. Thus, for an English source language and a Chinese target language, a translation probability $P(c|e)$ of a Chinese n-gram c given and English n-gram e is calculated.

For example, a particular translation model can be trained on parallel text in the phrase training data 102 to estimate the most likely translation probabilities. For example, a translation model can be defined according to a number of parameters that are estimated according to particular rules and trained on particular parallel text. An example of a translation model is the IBM Model 3 described, for example, in P. F. Brown, V. J. Della Pietra, S. A. Della Pietra, and R. L. Mercer, *The Mathematics of Statistical machine Translation: Parameter Estimation*, Computational Linguistics 19(2), 1993.

Other probabilities that can be associated with the phrases include a probability that a particular phrase belongs to a particular language, e.g., for use in a language identification system. In particular, for each phrase (or n-gram) a list of languages can be stored along with a respective probability for each language.

A normalized phrase table 106 is generated using the phrases 106. The normalized phrase table 106 includes multiple key-value pairs. Each key includes a normalized phrase derived from the phrases 104. A normalized phrase is a phrase that has been simplified to encompass different variants of the phrase. For example, case can be disregarded and wildcards can be used to account for different morphologies.

Each key also has a corresponding value. The value includes each un-normalized phrase from the phrases 104 that is associated with the normalized phrase (e.g., the normalized version of each associated un-normalized phrase corresponds to the normalized phrase of the key). Additionally, the value also includes one or more parameters associated with each un-normalized phrase such as a probability of the un-normalized phrase or a translation of the un-normalized phrase. An example process for generating a normalized phrase table (e.g., normalized phrase table 106) is described in greater detail below in FIG. 2.

The normalized phrase table 106 is used with model training data 107 to train a machine learning model 108. In some implementations, the machine learning model 108 is a parameterized model that includes a number of feature functions and feature weights. The feature functions can include many distinct features including, for example, phrases, n-grams, and other lexical features. Each feature weight corresponds to a particular feature of the model.

Training the machine learning model 108 can include discriminative training to identify feature weights that optimize the model output with respect to scoring criteria for a collection of training example in model training data 107. For example, in a machine translation application, the training examples can include known phrase translation pair where the pair includes an input phrase in one language and a known output translated phrase in a second language.

The model is trained to calculate a best scoring output. In particular, a given model can used to calculate the one or more feature weights such that the likelihood of a given input resulting in a correct output is maximized according to particular scoring criteria.

For example, for a machine translation system, the model can be trained to calculate feature weights to maximize the likelihood that a given input sentence in a first language is correctly translated into a target language sentence. The scoring criteria used to estimate the maximum likelihood can be, for example, a Bilingual Evaluation Understudy ("BLEU") score BLEU is a method for evaluating the quality of text which has been translated from one natural language to another using machine translation. The BLEU score provides a measure of the statistical closeness of machine translations to reference translations.

The BLEU score is described, for example, in Kishore Papineni, Salim Roukos, Todd Ward, and Wei-Jing Zhu, *BLEU: a Method for Automatic Evaluation of Machine Translation*, Proceedings of the 40th Annual Meeting on the Association for Computational Linguistics, pages 311-318, July 2002. The BLEU score is a geometric mean of a ratio of matching n-grams of length one to four between a candidate translation and a group of reference translations, along with a length term penalizing short sentences. The sufficient statistics of the BLEU score are the number of matching n-grams (i.e., n-gram precisions for the group of reference translations), the candidate translation length, and the effective length of the reference translations of the group. Other metrics can be used as appropriate for the particular machine learning application, for example, a loss function or a cost.

In some implementations, the machine learning model is trained in a distributed system (e.g., using multiple machines). The machine learning model can be trained using one or more appropriate distributed processing techniques including, for example, MapReduce. Details of MapReduce are described, for example, in J. Dean and S. Ghemawat, *MapReduce: Simplified Data Processing on Large Clusters*, Proceedings of the 6th Symposium on Operating Systems Design and Implementation, pp. 137 150 (Dec. 6, 2004).

Once trained, the machine learning model can receive an input 110 and produce an output 112. For example, for a machine translation system, the model 108 can receive an input string (e.g., a sentence) in one natural language and produce an output string (e.g., a translated sentence) in a second natural language. In another example, for a language identification system, the input 110 can be a string in a first language and the output 112 can be an identification of that language (e.g., identified as English, German, Chinese, etc.).

In some implementations, the phrases 104 and their associated probabilities are received in completed form (e.g., from a remote source) such that the phrase training data 102 is not needed. The normalized phrase table 106 can then be generated directly using the received phrases 104. In some implementations, phrases 104 include a phrase table of un-normalized phrases. The phrase table can include each un-normalized phrase as a key value and one or more associated parameters of the un-normalized phrase as the corresponding value.

Figure 2:
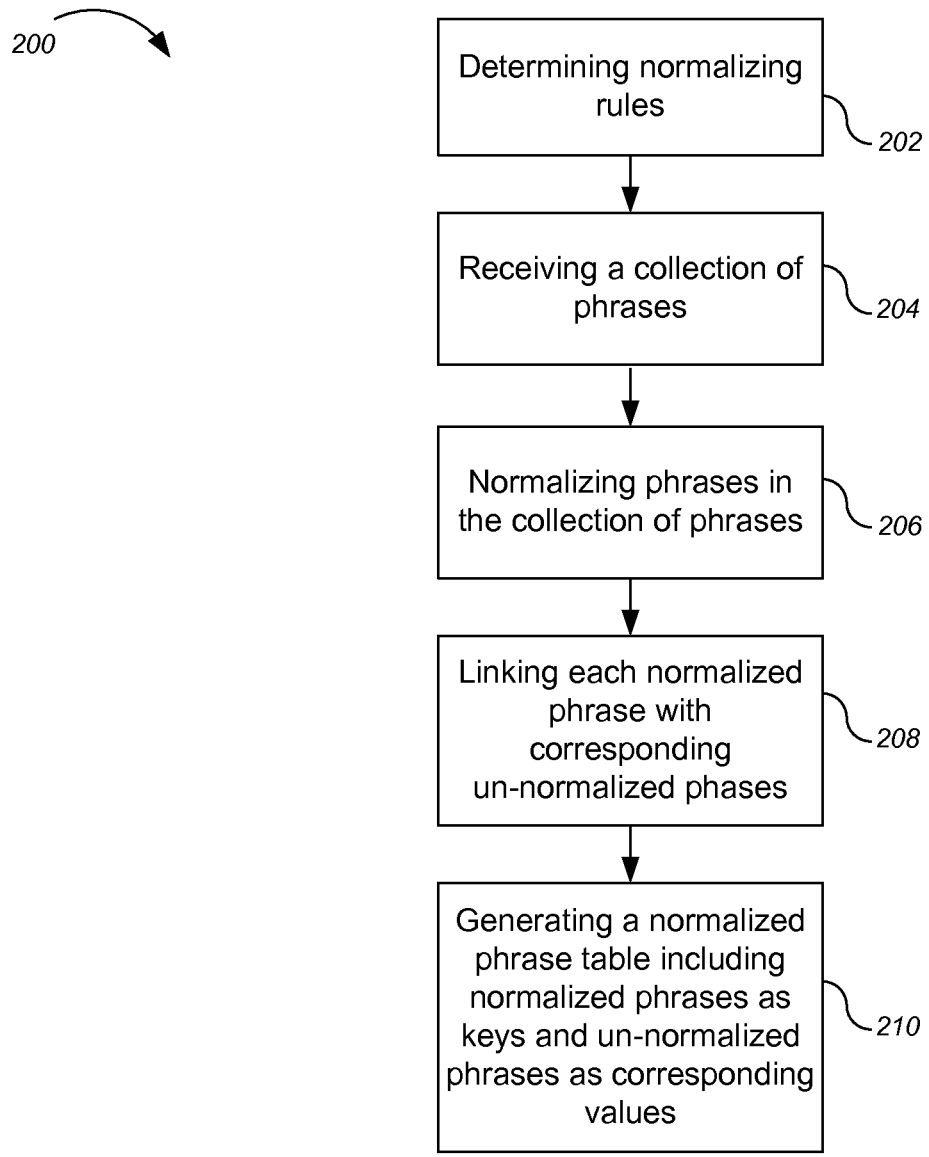
FIG. 2 is a flowchart of an example process for generating a normalized phrase table.

FIG. 2 is a flowchart of an example process 200 for generating a normalized phrase table. For convenience, the process 200 will be described with respect to a system that will perform the process 200.

The system determines 202 one or more normalizing rules. The one or more normalizing rules identify how phrases are normalized to account for various phrase variations. The normalizing rules can include, for example, rules associated with case, spelling, morphological variations, or other properties. For example, case rules can reduce all normalized phrases to lower case. Spelling variations can account for common spelling variations, for example, British versus American spelling (e.g., "color" versus "colour"). Morphological variations can include masculine versus feminine versus neuter gender, stemming, and other grammatical variants. In some implementations, the normalizing rule also removes language identifying information. For example, the phrase can include a particular language identifier (e.g., "box"/English). This language identifier can be removed in order to generate a language independent normalized phrase table. Thus, in some implementations, a single normalized phrase table is used for phrases in multiple languages instead of having separate phrase tables for each language.

The system receives 204 a collection of phrases. The collection of phrases includes other information associated with the phrases, for example, probabilities, translations, or language identifiers. The particular information can depend upon the machine learning application the collection of phrases is to be used for. In some implementations, the system receives the collection of phrases as a previously generated collection. Alternatively, in some other implementations, the system generates the collection of phrases using training data (e.g., using phrase training data 102 of FIG. 1).

The system normalizes 206 multiple phrases from the collection of phrases. In some implementations, the system normalizes all phrases in the collection. Alternatively, in other implementations, the system normalizes particular phrases according to specified criteria. For example, the specified criteria can prevent normalizing that would result in a very large number of associated un-normalized phrases.

The phrases are normalized by applying the normalizing rules to each phrase to be normalized. For example, the phrase "Dialogue with the President of Argentina" having an English language identifier can be normalized to "dialog with the president of argentina". Normalizing the phrase included a case rule that removed all capitalization, a spelling variation rule that normalized "dialogue" to "dialog" and a language identifier rule that removed the English language identifier. Different rules can be applied depending on the content of the particular phrase to be normalized.

The system links 208 each normalized phrase with the corresponding un-normalized phrases. Thus, the system identifies each phrase in the collection of phrases that has a common normalized phrase. For example, the normalized phrase "dialog with the president of argentina" can be linked to three un-normalized phrase variants in the collection of phrases: "dialog with the president of Argentina", "dialogue with the president of Argentina", and "Dialogue with the President of Argentina".

The system generates 210 a normalized phrase table including key-value pairs. The normalized phrase table includes the normalized phrases as keys. The normalized phrase table also includes the linked un-normalized phrases associated with the normalized phrases as the corresponding value in the key-value pairs. In addition, one or more parameters associated with each un-normalized phrase are included in the value depending on the type of phrase. For example, each un-normalized phrase can include parameters identifying one or more of a probability, a translation, or a language identifier.

Figure 3:
FIG. 3 shows an example normalized phrase table.

FIG. 3 shows an example normalized phrase table 300. The normalized phrase table 300 includes keys 302 and values 304. The keys 302 include normalized phrases. The values 304 include associated un-normalized phrases and their parameters. For example, one key is normalized phrase "NPhrase 1" 306. The value for normalized phrase 306 includes un-normalized phrase 308 and un-normalized phrase 310. Additionally, each un-normalized phrase includes one or more parameters associated with that particular un-normalized phrase. Each normalized phrase can have a different number of un-normalized phrases in the corresponding value. For example, normalized phrase 306 has a value including two un-normalized phrases while normalized phrase 312 has a value including three un-normalized phrases.

The one or more parameters associated with each un-normalized phrase can vary depending on the type of machine learning the normalized phrase table is being used for. For example, the parameter can include translations as shown in Table 1.

TABLE 1

| Key (normalized phrase) | Value (associated un-normalized phrases with translation) |
|---|---|
| "dialog"/English | "dialog"/English→"di?logo"/Spanish<br>"dialogs"/English→"di?logos"/Spanish |

Table 1 shows that a normalized phrase "dialog" is language specific to English. The value for the key "dialog" includes two un-normalized phrases that each has a particular translation in Spanish. The translation can include a wildcard to provide for spelling variations in the translation. Additionally, each translation can include an associated probability (e.g., the probability that the particular un-normalized phrase corresponds to the translated phrase). Alternatively, each un-normalized phrase can include a cost value (e.g., a negative log probability) associated with the un-normalized phrase as a feature.

In another example, the one or more parameters can include probabilities associated with the particular un-normalized phrase as shown in Table 2.

TABLE 2

| Key (normalized phrase) | Value (associated un-normalized phrases) |
|---|---|
| "dialog" | "dialog"→0.00489<br>"dialogue"→0.00032<br>"Dialogue"→0.00013 |

Table 2 shows that a normalized phrase "dialog" is associated with three un-normalized phrases, "dialog", "dialogue", and "Dialogue". A normalized phrase can also be identical to an un-normalized phrase, e.g., "dialog" is both the normalized phrase and one of the un-normalized phrases. Each un-normalized phrase also includes an associated probability value. Alternatively, each un-normalized phrase can include a cost value associated with the un-normalized phrase as a feature. For example, the probability can be the probability that the phrase occurs as estimated from a collection of text in phrase training data.

In one other example, the one or more parameters can include a language identifier associated with the particular un-normalized phrase as shown in Table 3.

TABLE 3

| Key (normalized phrase) | Value (associated un-normalized phrases) |
|---|---|
| "gift"/* | "gift"→English<br>"Gift"→English<br>"Gift"→German<br>"giFT"→English |

Table 3 shows that a normalized phrase "gift"/* (where "*" means any language) is associated with four un-normalized phrases, each identified as belonging to a particular language. In particular, the un-normalized phrases "gift" and "Gift" are both identified as English (e.g., case variants of the normalized phrase). However, "Gift"/German is a German word meaning "poison". Additionally, the un-normalized phrase "giFT" is an English word variant having a specialized meaning as an acronym describing a particular project for performing network file transfers. Each identified language can also include an associated probability for the identified language (e.g., the likelihood that the un-normalized phrase belongs to the identified language) or a cost associated with the un-normalized phrase as a feature.

In some implementations, Table 1 and Table 3 are combined to provide both an identification of the language for un-normalized phrases as well as their translations into another language along with the corresponding probabilities for each.

Figure 4:
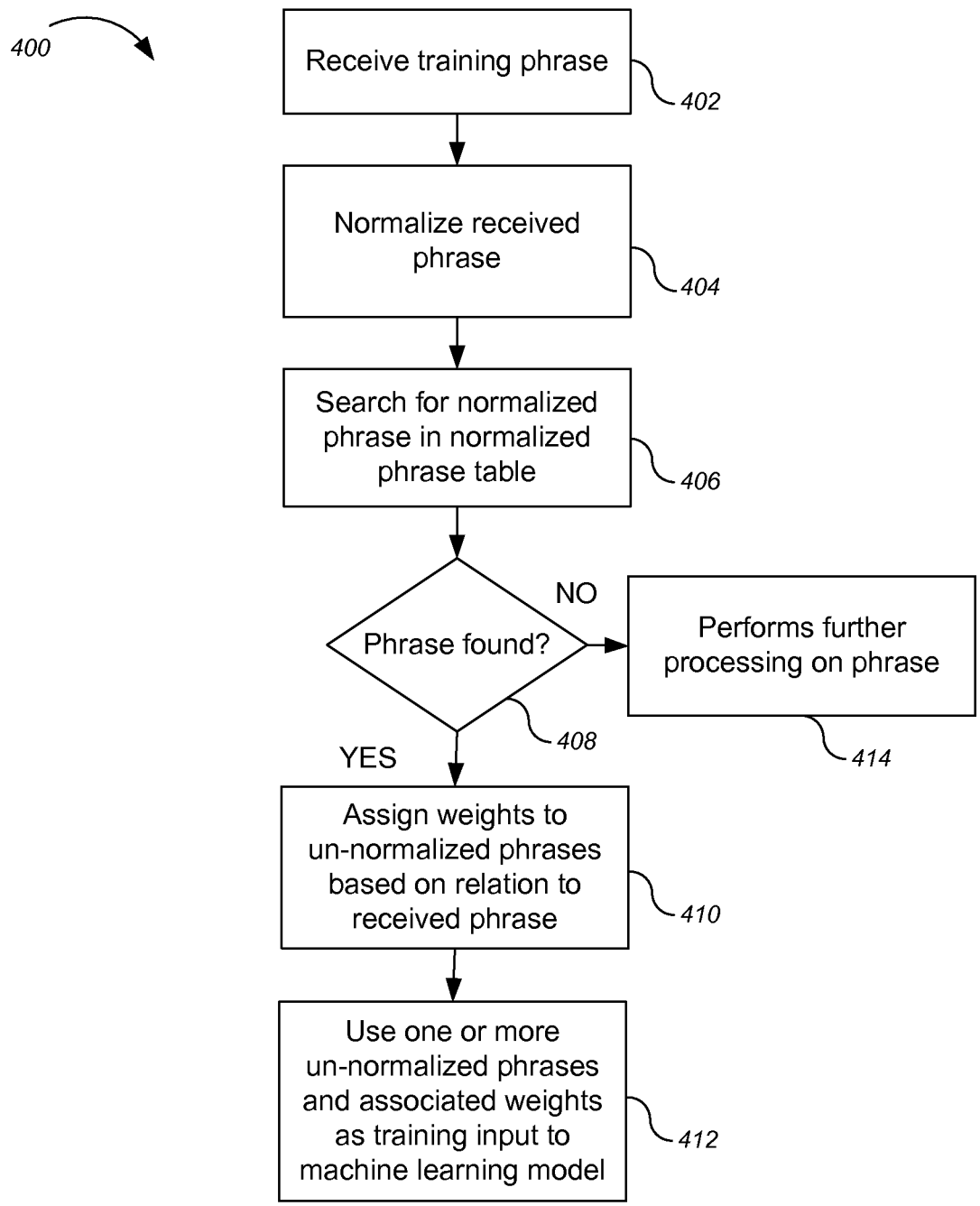
FIG. 4 is a flowchart of an example process for using a normalized phrase table.

FIG. 4 is a flowchart of an example process 400 for using a normalized phrase table. For convenience, the process 400 will be described with respect to a system that will perform the process 400.

The system receives 402 a training phrase. The training phrase can be received, for example, from model training data including a collection of text. In some implementations, the model training data has already been divided into a collection of example training phrases. In some other implementations, the system first generates the phrases. Alternatively, the system can receive the training phrase from a collection of phrases that were used to generate the normalized phrase table.

The system normalizes 404 the received phrase. The system normalizes the received phrase according to specified normalization rules, for example, regarding case, morphology, and removing identifiers, as described above. For example, the received phrase is "Dialog with the President of Argentina"/English, can be normalized to "dialog with the president of argentina" without any language identification. In particular, a case normalization rule removed the capitalizations from the phrase and the language identification rule removed the language identifier.

The system searches 406 for the normalized phrase in a normalized phrase table. In some implementations, the phrase table is a located at a single location. Additionally, the normalized phrase keys can be positioned in the normalized phrase table in lexical order. A search of the normalized phrase table (e.g., a binary search or a query issued across a distributed system) can be used to identify the key corresponding to the normalized phrase.

In some alternative implementations, the normalized phrase table is distributed. For example, the normalized phrase table can be sharded into multiple chunks, each chunk having a portion of the key-value pairs. When looking up a key for a particular normalized phrase, the search can be limited to a particular shard machine that includes the corresponding key-value. The keys of normalized phrase table can be arranged in lexical order. The shards maintain the same ordering such that each chunk can be indexed to identify the beginning and ending key of the chunk. The search for the normalized phrase includes identifying the correct chunk based on the index values and then searching that particular chunk.

The system determines 408 whether the normalized phrase is found. If the phrase is not found, the system performs 414 further processing on the phrase (e.g., either the normalized phrase or the original un-normalized phrase). For example, in a machine translation application, if the phrase is a single word n-gram, the system can introduce an identify translation phrase that translates the phrase with itself.

Other processing of the phrase can be performed for other applications. For example, in building a language model, the system can perform a back-off for phrases composed of n-grams greater than order 1 (e.g., reducing the phrase to a lesser included phrase) that are not found in the normalized phrase table. The system can then search for the lesser included normalized phrase and modify a resulting probability for the lesser included phrase a specified back-off factor weight for the particular phrase. Additionally back-offs can be performed if the lesser included phrase is not found. In some implementations, if the back-off does not result in a match, a constant probability can be assigned.

In some other alternative implementations, if the normalized phrase is not found in the normalized phrase table the system can discard that particular received phrase from the model training.

If the normalized phrase is found in the normalized phrase table, the system assigns 410 weights to features corresponding to one or more associated un-normalized phrases based on their relation to the received phrase. The weight can be, for example, an additional cost assigned to the feature. In some implementations, if there is an un-normalized phrase that exactly matches the received phrase, then the only the parameter associated with that particular un-normalized phrase is used as a feature function input to the machine learning model.

In some implementations, a weight is determined according to a union of all un-normalized phrases associated with the normalized phrase (e.g., a combination of probabilities associated with each un-normalized phrase). For example, in machine translation applications, normalization of variants such as by case or by stemming often does not change the actual translation. By combining these un-normalized variants, the received phrase can be input with a boosted weight over the individual un-normalized phrases.

In some other implementations, varied weights can be input to the model for each un-normalized phrase based on a similarity measure to the received phrase. Thus a weighted preference can be assigned to the different un-normalized phrases based on particular criteria. For example, a distance measure can be used to determine a similarity between un-normalized phrases and the received phrase. Alternatively, in another implementation, the distance measure is used to determine a similarity between the un-normalized phrases and the identified normalized phrase. The distance measure can be calculated, for example, based on the types of normalized changes from the received phrase.

For example, the distance measure can be a vector where each component indicates a distance according to a particular normalization rule. For example, if a case normalization rule (i.e., all lowercase) and a stemming normalization rule are performed on received phrases, the distance for the phrase pair "house" and "House" can be represented by the vector <1, 0> where 1 represents case and 0 represents morphology since the two phrases differ only by case. In contrast, the distance for the phrase pair "house" and "houses" can be represented by vector <0, 1> because they differ in morphology but not case. Finally, the distance for the phrase pair "House" and "houses" can be represented by vector <1, 1> because they differ in both morphology and case. The different distance measures can be used to associate an additional weight or cost to the particular un-normalized phrase, e.g., when used as a feature.

In some implementations, different normalization rules are not equally weighted. For example, in some implementations, a change in case results in a smaller distance than a change in morphology. The weights applied to each normalization rule can vary according to the effect on the particular machine learning system (e.g., based on the degree of change to a phrase translation for particular normalization rules).

In some other implementations, when the received phrase does not match an un-normalized phrase, a closest matching un-normalized phrase can be determined using language-specific grammar rules that indicate phrases that are likely to provide similar results (e.g., phrases likely to provide similar translations). For example, a received phrase "dialoging" (normalized to dialog) may not have a matching un-normalized phrase in the normalized phrase table. However, a preference can be made based on linguistic rules to prefer the un-normalized phrase "dialog" over the un-normalized phrase "dialogs".

The system uses 412 one or more un-normalized phrases and associated weights as training input to the machine learning model. In particular, the weights and their associated un-normalized phrases can be used as feature functions in a machine learning model. For example, when translating an example sentence from the model training data, the system selects one or more phrases that form the sentence. Using the normalized phrase table, more than one feature function may be identified for each phrase (e.g., because of multiple un-normalized variants each having being associated with a particular feature function).

These feature functions are included in the discriminative training of the model based on the example input such that model weights are determined based on how much emphasis to place on particular feature functions. Specifically, the discriminative training learns overall weights associated with the feature functions in order to maximize an output scoring metric. For example, in maximum-BLEU training a weight vector is learned to maximize the BLEU score.

More specifically, in one example, in general each un-normalized phrase learned by the system has a particular feature values, for example, a cost (e.g., negative log probability) and/or a count. For example, an un-normalized English→Spanish translation phrase table can include the un-normalized key and the associated value:

open→abierto (cost=2.0; count=100)
opener→abridor (cost=1.0; count=50).

During the discriminative training of the model, which is performed in the context of the entire system, particular overall feature λ costs and λ counts can be assigned.

Now, for a normalized form of the un-normalized key this changes to normalized key: un-normalized key→value, for example:

open: open→abierto (cost=2.0; count=100)
open: opener→abridor (cost=1.0; count=50).

For a received training phrase "opened" (e.g., from model training data), the system looks up the normalized form "open", e.g., in the normalized phrase table. Typically, a selection is made from the un-normalized values. In this example, neither exactly matches the received training phrase. A selection can be made of the most similar un-normalized phrase without considering the context of the phrase. However, this could be incorrect given the context. Thus, instead, the system returns multiple possible results (e.g., each un-normalized option), with some additional costs based on the similarity of each un-normalized phrase to the received phrase. For example:

open: open→abierto (cost=2.0; count=100; stemming cost=2)
open: opener→abridor (cost=1.0; count=50; stemming cost=4).

Using these additional costs to the features, the discriminative training can evaluate the features within the context of other features to learn the best overall feature weights (e.g., λ costs). Thus, the decision of the best un-normalized phrase does not need to be made at the lookup phase, but instead a soft decision can be made that allows multiple weighted un-normalized phrases be used as features to the discriminatively training model.

Once the machine learning model is trained, it can be used to process received input to produce particular output. For example, if the model is a machine translation model, the trained model can receive an input string (e.g., a sentence) in one language and output a translated string in a second language.

Figure 5:
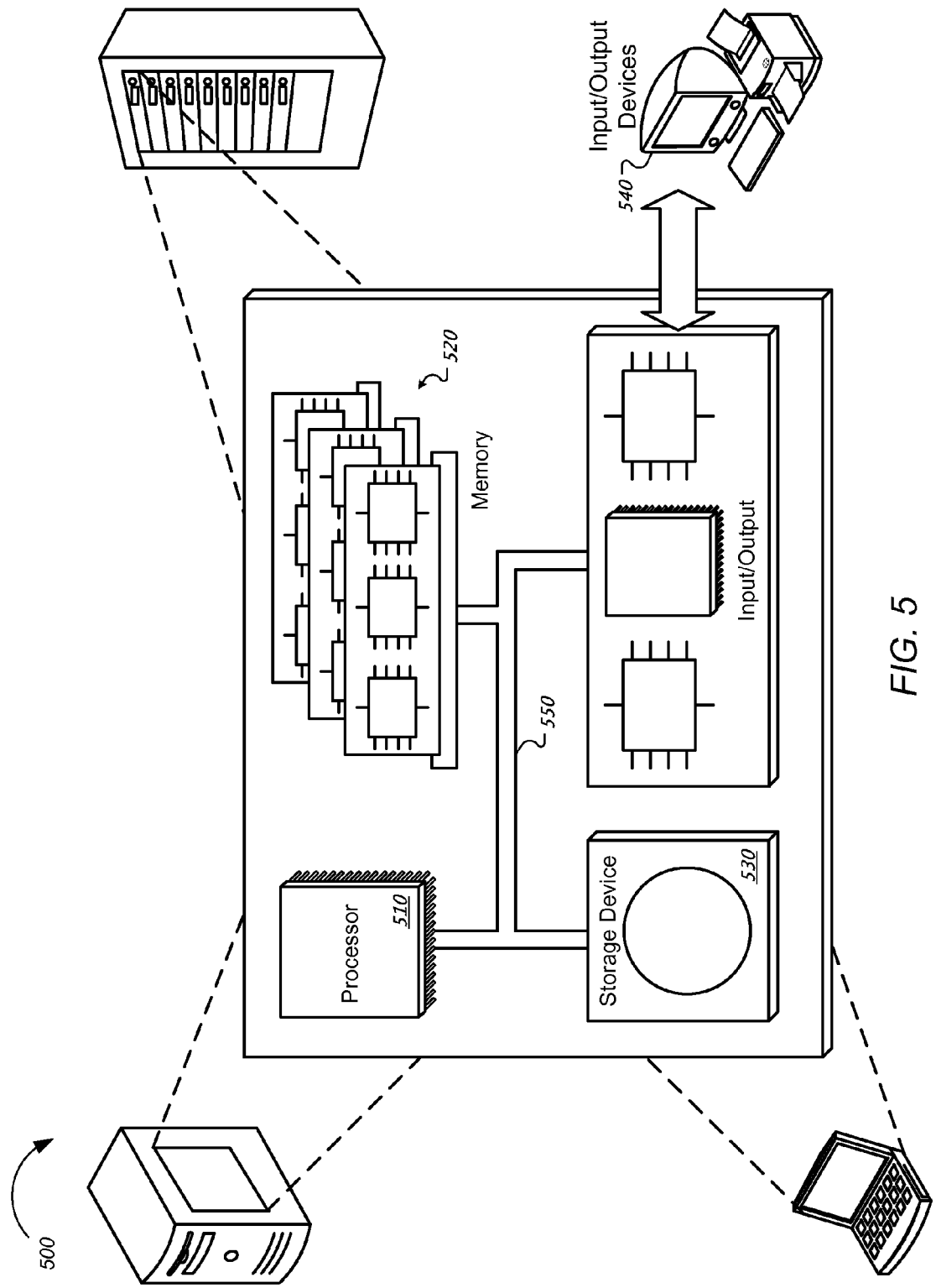
FIG. 5 is a schematic diagram of a generic computer system.

FIG. 5 is a schematic diagram of a generic computer system 500. The system 500 can be used for practicing operations described, for example in association with the method 400 of FIG. 4, in one embodiment or the method 200 of FIG. 2 in another embodiment. The system 500 can include a processor 510, a memory 520, a storage device 530, and input/output devices 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 is a computer readable medium such as volatile or non volatile that stores information within the system 500. The storage device 530 is capable of providing persistent storage for the system 500. The storage device 530 may be a floppy disk device, a hard disk device, an optical disk device, or a tape device, or other suitable persistent storage means. The input/output device 540 provides input/output operations for the system 500. In one implementation, the input/output device 540 includes a keyboard and/or pointing device. In another implementation, the input/output device 540 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method executed by one or more processors, the method comprising:
  receiving a collection of phrases;
  normalizing a plurality of phrases of the collection of phrases, the normalizing being based at least in part on lexicographic normalizing rules;
  generating a normalized phrase table including a plurality of key-value pairs, each key-value pair having a key that includes a normalized phrase and a value that includes one or more un-normalized phrases associated with the normalized phrase of the key and one or more parameters associated with each un-normalized phrase, the one or more parameters including a translation corresponding to the normalized phrase and a probability for the translation given the normalized phrase;
  receiving a training phrase;
  normalizing the training phrase according to one or more lexicographic normalization rules;
  locating the normalized training phrase in a normalized phrase table, the normalized phrase table including a plurality of key-value pairs, each key-value pair having a key that includes a normalized phrase and a value that includes one or more un-normalized phrases associated with the normalized phrase of the key and one or more parameters associated with each un-normalized phrase;

associating one or more weights to one or more un-normalized phrases associated with the key-value pair for the identified normalized training phrase in the normalized phrase table based on a relation of each associated un-normalized phrase to the received training phrase; and determining a degree of match between the received training phrase and a specific un-normalized phrase associated with the located normalized training phrase, the degree of match being determined according to a similarity measure, wherein associating one or more weights comprises:

associating a first weight to the specific un-normalized phrase when the training phrase has a high degree of match with the specific un-normalized phrase, and associating a second weight to the specific un-normalized phrase when the training phrase has a low degree of match with the specific un-normalized phrase.

2. The method of claim 1, where normalizing each phrase of the plurality of phrases includes applying one or more normalizing rules, the one or more normalizing rules including rules normalizing based on a case and a morphology of the phrase.

3. The method of claim 1, where the one or more parameters associated with each un-normalized phrase include an identification of a language associated with the phrase.

4. The method of claim 1, where the normalized phrase table includes a plurality of normalized phrases corresponding to un-normalized phrases in a plurality of languages.

5. A computer-implemented method executed by one or more processors, the method comprising:

receiving a training phrase;

normalizing the training phrase according to one or more lexicographic normalization rules;

locating the normalized training phrase in a normalized phrase table, the normalized phrase table including a plurality of key-value pairs, each key-value pair having a key that includes a normalized phrase and a value that includes one or more un-normalized phrases associated with the normalized phrase of the key and one or more parameters associated with each un-normalized phrase;

associating one or more weights to one or more un-normalized phrases associated with the key-value pair for the identified normalized training phrase in the normalized phrase table based on a relation of each associated un-normalized phrase to the received training phrase;

determining a degree of match between the received training phrase and a specific un-normalized phrase associated with the located normalized training phrase, the degree of match being determined according to a similarity measure, wherein associating one or more weights comprises:

associating a first weight to the specific un-normalized phrase when the training phrase has a high degree of match with the specific un-normalized phrase, and associating a second weight to the specific un-normalized phrase when the training phrase has a low degree of match with the specific un-normalized phrase; and training a machine learning model using the one or more un-normalized phrases and the associated one or more weights.

6. The method of claim 5, where associating one or more weights further comprises:

assigning a weight to each un-normalized phrase based on a distance measure between each un-normalized phrase and the received training phrase.

7. The method of claim 6, where the distance measure includes determining a distance vector having entries corresponding to the one or more lexicographic normalization rules.

8. The method of claim 5, where training the machine learning model includes:

using one or more un-normalized phrases and their associated assigned weights as particular feature functions for the received phrase in a machine learning model.

9. The method of claim 5, where training the machine learning model includes training a language model.

10. The method of claim 5, where training the machine learning model includes training a language identification model.

11. The method of claim 5, where training the machine learning model includes training a statistical machine translation model.

12. The method of claim 5, where identifying the normalized phrase includes identifying a particular chunk of a distributed normalized phrase table including a key value corresponding to the normalized training phrase and searching the identified chunk for the normalized training phrase.

13. A computer program product, encoded on a non-transitory computer-readable medium, operable to cause a data processing apparatus to perform operations comprising:

receiving a collection of phrases;

normalizing a plurality of phrases of the collection of phrases, the normalizing being based at least in part on lexicographic normalizing rules;

generating a normalized phrase table including a plurality of key-value pairs, each key-value pair having a key that includes a normalized phrase and a value that includes one or more un-normalized phrases associated with the normalized phrase of the key and one or more parameters associated with each un-normalized phrase, the one or more parameters including a translation corresponding to the normalized phrase and a probability for the translation given the normalized phrase;

receiving a training phrase;

normalizing the training phrase according to one or more lexicographic normalization rules;

locating the normalized training phrase in a normalized phrase table, the normalized phrase table including a plurality of key-value pairs, each key-value pair having a key that includes a normalized phrase and a value that includes one or more un-normalized phrases associated with the normalized phrase of the key and one or more parameters associated with each un-normalized phrase;

associating one or more weights to one or more un-normalized phrases associated with the key-value pair for the identified normalized training phrase in the normalized phrase table based on a relation of each associated un-normalized phrase to the received training phrase; and determining a degree of match between the received training phrase and a specific un-normalized phrase associated with the located normalized training phrase, the degree of match being determined according to a similarity measure, wherein associating one or more weights comprises:

associating a first weight to the specific un-normalized phrase when the training phrase has a high degree of match with the specific un-normalized phrase, and associating a second weight to the specific un-normalized phrase when the training phrase has a low degree of match with the specific un-normalized phrase.

14. The computer program product of claim 13, where normalizing each phrase of the plurality of phrases includes applying one or more normalizing rules, the one or more normalizing rules including rules normalizing based on a case and a morphology of the phrase.

15. The computer program product of claim 13, where the one or more parameters associated with each un-normalized phrase include an identification of a language associated with the phrase.

16. The computer program product of claim 13, where the normalized phrase table includes a plurality of normalized phrases corresponding to un-normalized phrases in a plurality of languages.

17. A computer program product, encoded on a non-transitory computer-readable medium, operable to cause a data processing apparatus to perform operations comprising:
receiving a training phrase;
normalizing the training phrase according to one or more lexicographic normalization rules;
locating the normalized training phrase in a normalized phrase table, the normalized phrase table including a plurality of key-value pairs, each key-value pair having a key that includes a normalized phrase and a value that includes one or more un-normalized phrases associated with the normalized phrase of the key and one or more parameters associated with each un-normalized phrase;
associating one or more weights to one or more un-normalized phrases associated with the key-value pair for the identified normalized training phrase in the normalized phrase table based on a relation of each associated un-normalized phrase to the received training phrase;
determining a degree of match between the received training phrase and a specific un-normalized phrase associated with the located normalized training phrase, the degree of match being determined according to a similarity measure, wherein associating one or more weights comprises:
associating a first weight to the specific un-normalized phrase when the training phrase has a high degree of match with the specific un-normalized phrase,
associating a second weight to the specific un-normalized phrase when the training phrase has a low degree of match with the specific un-normalized phrase; and
training a machine learning model using the one or more un-normalized phrases and the associated one or more weights.

18. The computer program product of claim 17, where associating one or more weights further comprises:
assigning a weight to each un-normalized phrase based on a distance measure between each un-normalized phrase and the received training phrase.

19. The computer program product of claim 18, where the distance measure includes determining a distance vector having entries corresponding to the one or more lexicographic normalization rules.

20. The computer program product of claim 17, where training the machine learning model includes:
using one or more un-normalized phrases and their associated assigned weights as particular feature functions for the received phrase in a machine learning model.

21. The computer program product of claim 17, where training the machine learning model includes training a language model.

22. The computer program product of claim 17, where training the machine learning model includes training a language identification model.

23. The computer program product of claim 17, where training the machine learning model includes training a statistical machine translation model.

24. The computer program product of claim 17, where identifying the normalized phrase includes identifying a particular chunk of a distributed normalized phrase table including a key value corresponding to the normalized training phrase and searching the identified chunk for the normalized training phrase.

25. A system comprising:
one or more computers configured to perform operations including:
receiving a collection of phrases;
normalizing a plurality of phrases of the collection of phrases, the normalizing being based at least in part on lexicographic normalizing rules;
generating a normalized phrase table including a plurality of key-value pairs, each key-value pair having a key that includes a normalized phrase and a value that includes one or more un-normalized phrases associated with the normalized phrase of the key and one or more parameters associated with each un-normalized phrase, the one or more parameters including a translation corresponding to the normalized phrase and a probability for the translation given the normalized phrase;
receiving a training phrase;
normalizing the training phrase according to one or more lexicographic normalization rules;
locating the normalized training phrase in a normalized phrase table, the normalized phrase table including a plurality of key-value pairs, each key-value pair having a key that includes a normalized phrase and a value that includes one or more un-normalized phrases associated with the normalized phrase of the key and one or more parameters associated with each un-normalized phrase;
associating one or more weights to one or more un-normalized phrases associated with the key-value pair for the identified normalized training phrase in the normalized phrase table based on a relation of each associated un-normalized phrase to the received training phrase; and
determining a degree of match between the received training phrase and a specific un-normalized phrase associated with the located normalized training phrase, the degree of match being determined according to a similarity measure, wherein associating one or more weights comprises:
associating a first weight to the specific un-normalized phrase when the training phrase has a high degree of match with the specific un-normalized phrase, and
associating a second weight to the specific un-normalized phrase when the training phrase has a low degree of match with the specific un-normalized phrase.

26. A system comprising:
one or more computers configured to perform operations including:
receiving a training phrase;
normalizing the training phrase according to one or more lexicographic normalization rules;
locating the normalized training phrase in a normalized phrase table, the normalized phrase table including a plurality of key-value pairs, each key-value pair having a key that includes a normalized phrase and a value that includes one or more un-normalized phrases associated with the normalized phrase of the key and one or more parameters associated with each un-normalized phrase;

associating one or more weights to one or more un-normalized phrases associated with the key-value pair for the identified normalized training phrase in the normalized phrase table based on a relation of each associated un-normalized phrase to the received training phrase;

determining a degree of match between the received training phrase and a specific un-normalized phrase associated with the located normalized training phrase, the degree of match being determined according to a similarity measure, wherein associating one or more weights comprises:
- associating a first weight to the specific un-normalized phrase when the training phrase has a high degree of match with the specific un-normalized phrase,
- associating a second weight to the specific un-normalized phrase when the training phrase has a low degree of match with the specific un-normalized phrase; and training a machine learning model using the one or more un-normalized phrases and the associated one or more weights.

* * * * *